March 11, 1969  K. H. N. SCHULPEN  3,431,802
DEVICE FOR THE MANUFACTURE OF OBJECTS OF
YIELDABLY DEFORMABLE MATERIAL
Filed Nov. 19, 1956

INVENTOR
Karel H. N Schulpen
BY
Stevens, Davis, Miller & Mosher
ATTORNEYS

United States Patent Office 3,431,802
Patented Mar. 11, 1969

3,431,802
DEVICE FOR THE MANUFACTURE OF OBJECTS
OF YIELDABLY DEFORMABLE MATERIAL
Karel H. N. Schulpen, Haviklaan 17,
The Hague, Netherlands
Filed Nov. 19, 1956, Ser. No. 623,210
Claims priority, application Germany, Nov. 21, 1955,
S 46,425; Netherlands, Feb. 13, 1956, 204,488
U.S. Cl. 83—4          3 Claims
Int. Cl. B26d 4/00, 7/14

This invention relates to a device for the manufacture of objects of yieldably deformable material, the said device comprising at least one cutting knife or like dividing means and one or more sets of co-operating plates, cylinders or other means having projections and/or recesses for deforming the material prior to cutting.

Numerous methods and devices for the manufacture of objects of yieldably deformable material, in particular of foam rubber and foam plastic, in this way are already known. These known methods and devices have the disadvantage that the subdividing means, usually a cutting band, is adjusted in such a way relatively to the deformed material to be cut that an object is formed only on one side of the subdividing means and the material on the other side is lost in the form of waste material.

The invention is based on the insight that objects of substantially equal shape may be manufactured on both sides of the subdividing means if the material is deformed in a manner corresponding therewith and that in various cases it is possible, by using two or more subdividing means, still to manufacture one or more other useful objects so that no material is wasted.

This is achieved in the device according to the invention in that the cutting knife or dividing means is arranged in such a manner relatively to the co-operating plates, cylinders or like deforming means having projections and/or recesses that the plane or planes according to which the cutting means is cutting passes between the deforming means at a distance from each of said deforming means.

According to the invention the projections and/or recesses of the sets of co-operating plates, cylinders or other means for deforming the material may be arranged in staggered position relatively to each other. The projections may consist at least partly of material adapted to be cut through by the cutting knife or some other dividing means.

The invention will be elucidated below with reference to the accompanying drawings showing by way of example some embodiments of the device according to the invention.

Figure 1:
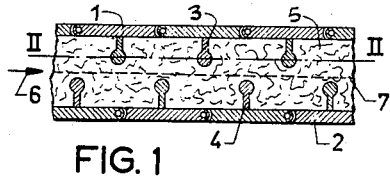
FIG. 1 shows a longitudinal section of part of a device comprising projections arranged in staggered position relatively to each other.
Figure 2:
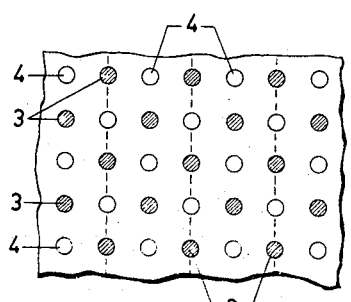
FIG. 2 is a section according to the line II—II of FIG. 1.

FIGS. 1 and 2 show part of a device comprising two endless conveyor belts consisting of parts 1, 2 hingedly arranged relatively to each other and each carrying a number of projections 3, 4. As may be seen from FIG. 2 these projections are arranged in staggered position relatively to each other. Between these two conveyor belts there is provided a block 5 of foam plastic or some other yieldably deformable material which is compressed by these conveyor belts and projections. This block of material is supplied by the endless conveyor belts to a cutting knife 6 or some other simple or multiple cutting means. As a cutting means it is preferred to use a cutting means comprising two plate- or strip-shaped knives, said knives being given a rapid reciprocating movement in opposite sense relatively to each other and being arranged with one of their sides substantially against each other. As a result the block of material is subdivided into two portions each having elevations and depressions and being of substantially the same shape. In this way it is possible to cut two mattresses out of one block of material, the elevations and depressions increasing the elasticity of the said mattresses, and, in addition, due to the fact that two mattresses are simultaneously made out of one block of material a considerable saving in material is achieved. When cutting these two mattresses out of one single block there is no waste material at all.

Obviously, it is possible by a correct selection of the shape of the projections to give the elevations and depressions any required shape and the projections 3 need not have the same shape as the projections 4 whilst there is also the possibility of the projections 3 or the projections 4 differing mutually. Consequently it is possible to manufacture objects of widely different shape.

The conveyor rollers for the endless conveyor belts, the frame of the device and the driving means for the conveyor belts and the cutting device have not been shown in the drawings since these may be constructed in a generally known manner and do not constitute per se an element of the invention.

Figure 3:
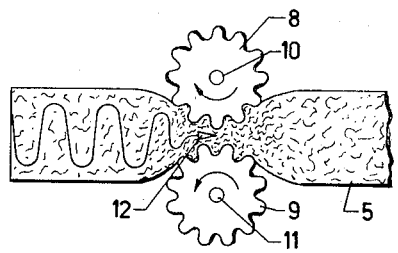
FIG. 3 shows in section part of a device by means of which a block of material is divided into two parts according to an undulating line.

FIG. 3 two two co-operating cylinders 8 and 9 having an undulated surface, said cylinders being driven in the sense of the arrows shown in this figure. These cylinders are arranged at a distance from each other, the shafts 10, 11 of these cylinders extending parallel to each other. A flat cutting means 12 has been arranged between these two cylinders. This cutting knife may consist for example of two strip-shaped means rapidly reciprocating relatively to each other and being subjected to spring action, these strip-shaped means being arranged in such a manner that they support each other.

When a block of material 5 is caught by these cylinders it is automatically propelled by and compressed between these cylinders and cut through by the cutting knife 12. Consequently two blocks are produced each having an undulated side.

If the block of material is obliquely supplied to the rollers 8 and 9, the undulations in both blocks will extend in an oblique manner. When the elevations on the outer surface of the cylinders are given different shapes objects with differently shaped elevators or depressions are produced. Instead of cylinders it is also possible to use toothed discs or discs having some other construction which are mounted at a distance from each other on parallel shafts. If required these discs may be arranged in staggered position relatively to each other.

Figure 4:
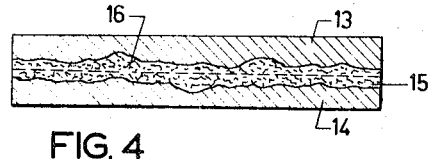
FIG. 4 shows an embodiment with two plates in each of which elevations and depressions are provided.

FIG. 4 shows two plates 13, 14 adapted to be moved towards and away from each other, each of these plates having elevations and depressions. When a block of yieldably deformable material 15 is introduced between these plates and said plates are moved towards each other, in which case, if required, one of the plates may remain in its place, the block of material is deformed in an entirely predetermined manner. When this block is cut through according to the dotted line 16, two portions are obtained which accurately have the required shape. In this way it is possible to manufacture exceedingly complicated objects in an accurate way.

Figure 5:
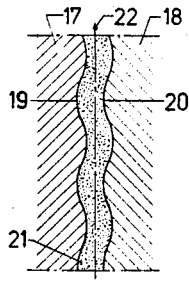
FIG. 5 shows an embodiment of a device with two plates provided with undulatory elevations and depressions.
Figure 6:
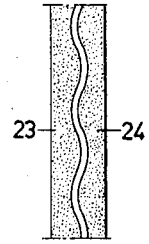
FIG. 6 shows the two objects obtained by means of this device in one single cutting operation.

FIG. 5 shows a device by means of which, as in the case of the device according to FIG. 3, objects having an undulated surface can be made. This device, like the device according to FIG. 4, comprises two plates 17, 18 adapted to be moved away from each other and having two undulatory surfaces 19. 20 facing each other. When a block 21 of yieldably deformable material is cut through according to the plane indicated with dash lines 22, the two objects 23 and 24 shown in FIG. 6 are formed, these objects being provided at one side with undulatory elevations and depressions.

Figure 7:
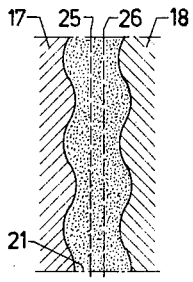
FIG. 7 is a sectional view of a modified form of the device.
Figure 8:
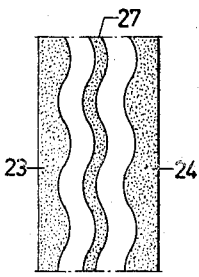
FIG. 8 is a sectional view of a further modification.

The device according to FIG. 7 differs from the device according to FIG. 8 only in that the block of yieldable material is cut through according to the two planes indicated by dash lines 25 and 26. Consequently two objects 23 and 24 are formed again each being provided on one side with undulatory elevations and depressions, whilst at the same time an object 27 is formed having undulations on two opposite sides. If more than two cutting means are used two or more of these objects 27 are obtained.

If desired, it is possible to form composite objects from the objects manufactured with the device according to the invention by uniting two or more objects by pasting, sealing or in some other manner.

Figure 9:
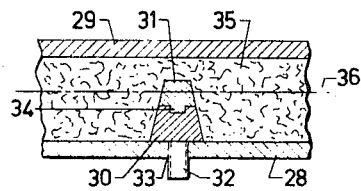
FIG. 9 is a sectional view of another form of the device.

FIG. 9 shows a device in which of two plates 28 and 29 adapted to be moved towards each other plate 28 is provided with a projection consisting of two parts 30, 31 of which part 30 has a threaded pin 32 adapted to be screwed into a threaded opening 33 of the plate 28. By screwing the pin 32 farther or less far into the opening 33, the projections 30, 31 will project less far or farther beyond the plate 28 so that objects of different shape may be manufactured. Part 31 consists of massive rubber, cork or some other material which may be easily cut and is arranged with a pin 34 in an opening of part 30. When a block 35 of yieldably deformable material compressed between the plates 28 and 29 is cut through according to the plane indicated with the dash line 36, part 31 will also be cut through. Consequently an opening is formed in the lower object. When it is necessary to cut through a new block, then part 31 should be replaced by a new part or the portion cut therefrom should be glued thereon again. By providing a plurality of these bipartite projections on the plate 28 and, if required, also on the plate 29, it is possible to obtain objects having several openings.

It is obvious that the invention is not restricted to the embodiments described above by way of example but that it is possible to modify these in numerous ways without departing from the scope of the invention.

What is claimed is:

1. A device for the simultaneous formation of at least two profiled objects of yieldably deformable material from a sheet of said material, each of said objects having a profiled surface which surfaces are substantially similar to one another, said device comprising at least one pair of co-operating compressing means for compressing the said sheet therebetween, said compressing means being provided in a substantially identical way with projections and recesses, the projections and recesses of one of the co-operating means being arranged in staggered position relative to the projections and recesses of the other one of said co-operating means, a subdividing means being interposed between the co-operating compressing means and coinciding with a flat plane passing between said co-operating means for being moved relative to said block of material according to a straight line perpendicular to the direction in which the material is compressed by the said co-operating compressing means.

2. A device for the simultaneous formation of at least two profiled objects of yieldably deformable material from a sheet of said material, each of said objects having a profiled surface, which surfaces are substantially similar to one another, said device comprising at least a pair of co-operating spaced compressing rollers for compressing the said sheet therebetween, said rollers being provided with projections and recesses between said projections, the projections and recesses of both rollers having substantially the same shape, said rollers being turned over an angle relative to each other so that at the place which the sheet of material is compressed, the projections and recesses of one of said rollers are in staggered position relative to the projections and recesses of the other one of said rollers, a subdividing means being interposed between the co-operating compressing means and coinciding with a flat plane passing between said co-operating means for being moved relative to said block of material according to a straight line perpendicular to the direction in which the material is compressed by the said co-operating compressing means.

3. A device for the simultaneous formation of at least two profiled objects of yieldably deformable material from a sheet of said material, each of said objects having a profiled surface, which surfaces are substantially similar to one another, said device comprising at least a pair of co-operating spaced compressing rollers for compressing the said sheet therebetween, said rollers being provided with projections and recesses between said projections, the projections and recesses of both rollers having substantially the same shape, said rollers being turned over an angle relative to each other so that at the place at which the sheet of material is compressed, the projections and recesses of one of said rollers are in staggered position relative to the projections and recesses of the other one of said rollers, the projections on said rollers being arranged in rows lengthwise of said rollers, the projections and recesses of each of said rows being also in staggered position relative to the projections and recesses of the adjacent rows of projections and recesses, a subdividing means being interposed between the co-operating compressing means and coinciding with a flat plane passing between said co-operating means for being moved relative to said block of material according to a straight line perpendicular to the direction in which the material is compressed by said co-operating compressing means.

References Cited

UNITED STATES PATENTS

| | | | |
|---|---|---|---|
| 549,027 | 10/1895 | Scott | 164—39 |
| 2,297,368 | 9/1942 | Rippl et al. | 164—68 |
| 1,204,922 | 11/1916 | Wilms | 164—34 |
| 1,868,932 | 7/1932 | Vernet | 164—34 X |
| 2,214,461 | 9/1940 | Hendry | 164—35 |
| 2,846,228 | 5/1958 | Dahle | 164—39 |
| 1,731,132 | 10/1929 | Hendry | 83—201 |
| 2,902,091 | 9/7959 | Dahle | 83—18 |

ANDREW R. JUHASZN, *Primary Examiner.*

U.S. Cl. X.R.

83—176